United States Patent [19]

Borst et al.

[11] Patent Number: 4,516,045

[45] Date of Patent: May 7, 1985

[54] ELECTRIC POWER MACHINE WITH PROTECTION AGAINST OVERSPEED

[75] Inventors: Erich Borst; Fritz Schädlich; Manfred Stäbler, all of Leinfelden-Echterdingen, Fed. Rep. of Germany

[73] Assignee: Robert Bosch GmbH, Stuttgart, Fed. Rep. of Germany

[21] Appl. No.: 610,238

[22] Filed: May 14, 1984

[30] Foreign Application Priority Data

Jun. 27, 1983 [DE] Fed. Rep. of Germany ....... 3323059

[51] Int. Cl.$^{3}$ .............................................. H02K 11/00

[52] U.S. Cl. ................................ 310/68 E; 200/80 R

[58] Field of Search ................. 310/68 R, 68 E, 66 R; 200/80 R, 80 B, 28, DIG. 32

[56] References Cited

U.S. PATENT DOCUMENTS

| | | | |
|---|---|---|---|
| 1,075,987 | 10/1913 | McMahon | 310/68 E |
| 3,790,730 | 2/1974 | Wyland | 310/68 E X |
| 4,205,245 | 5/1980 | Hildebrandt et al. | 310/68 E |
| 4,423,346 | 12/1983 | Nakazawa | 310/68 E |

*Primary Examiner*—Mark O. Budd
*Attorney, Agent, or Firm*—Michael J. Striker

[57] ABSTRACT

An electric power machine, particularly an angle grinding tool is provided with a centrifugal overspeed protecting device including a fly weight in the form of a severing blade which interrupts a power supply conduit when the rotary speed of the machine is excessive. The protective device includes a cylindrical housing attached face to face to the shaft of the electric motor. The severing blade is in the form of a quadrangular frame defining a center opening. The cylindrical housing is provided with a diametric through bore of a rectangular cross-section matching the frame-like severing blade. A blind bore of a circular cross-section is coaxially superposed on the rectangular through bore and its upper part is formed with inner thread for receiving a setting screw. A helical tensioning spring is inserted in the center opening of the frame-like severing blade and rests on the bottom of the blind bore to urge the centrifugal severing blade against the setting screw. When the rotary speed of the shaft and thus of the housing exceeds a predetermined value the severing blade is displaced by centrifugal force out of the rectangular through bore and severs a conduit in the power supply circuit for the motor whereby the compressed biasing spring acts as a buffer. The setting screw adjusts the distance on the center of gravity of the severing blade from the axis of rotation of the motor shaft and thus determines the value of the limit rotary speed.

4 Claims, 4 Drawing Figures

ELECTRIC POWER MACHINE WITH PROTECTION AGAINST OVERSPEED

BACKGROUND OF THE INVENTION

The present invention relates in general to an electric power machine provided with a safety mechanism against overspeed, particularly an angle grinding tool having a centrifugal severing plate for severing an electric conductor in the power supply circuit of a driving motor when an acceptable rotary speed of the grinding spindle is exceeded.

Known power machines of this kind are equipped with an electronic rotary speed regulating circuit. In the event of a failure in the regulator, however, the rotary speed of the motor shaft may rise above the acceptable maximum limit. This shortcoming is particularly dangerous in the case of angle grinders because the grinding disc mounted on the spindle may break when its circumferential speed is too high. In order to reliably avoid this danger it is known from prior art to employ a fly weight arranged in a housing on the driving shaft in such a manner that in the event of overspeed of the motor, the fly weight severes a conductor web in the power supply circuit of the motor. The disadvantage of this prior art centrifugal safety mechanism is the difficulty in setting the limit rotary speed at which the fly weight is displaced outward to interrupt the power supply circuit. In the prior art solutions this adjustment can be made only by tensioning a spiral spring on which the fly weight is suspended. Due to the limited space for the safety mechanism, a screw with an eccentric pin has been used as a support for the tensioning spring and consequently the total setting displacement for adjusting the limit rotary speed amounted only to half the rotation of this setting screw. Moreover, due to the restricted conditions the installation of this prior art overspeed protecting mechanism was extremely difficult and time consuming. In particular, the suspension of the tensioning spring on the eccentric pin of the setting screw was very difficult. Furthermore, the fly weight in severing the electric conductor might become damaged itself and the end of the tensioning spring might spring out from the protective housing and reestablish the electric connection in the power supply circuit.

SUMMARY OF THE INVENTION

It is therefore a general object of the present invention to overcome the aforementioned disadvantages.

More particularly, it is an object of the invention to provide an improved overspeed safety mechanism which requires less component parts than prior art devices of this kind and which is easy to install.

An additional object of the invention is to provide such an improved safety mechanism whose setting screw for adjusting the limit rotary speed adjusts not only the tension of the spring counteracting the centrifugal severing weight but permits also the setting of the effective centrifugal force acting on the fly weight so that the setting range of the adjusting screw is substantially increased.

A further object of the invention is to provide such an improved overspeed protection mechanism whose severing centrifugal weight is substantially more reliable than that in the prior art devices.

Furthermore, an object of this invention is to provide such an improved overspeed safety mechanism in which the danger of restoring the connection of severed power supply circuit by the tensioning spring is reliably eliminated.

In keeping with these objects and others which will become apparent hereafter, one feature of the invention resides, in an electric power tool having an overspeed protection means of the aforementioned kind, a combination which comprises a centrifugal severing blade in the form of a flat quadrangular frame defining two opposite rectangular bases each having a longer side and a shorter side, and a lateral opening between the bases, a diametrical through bore in the driving shaft or in a cylindrical housing coaxially attched to the shaft, the through bore having a clearance matching the outline of the bases of the severing blade for slidably guiding the latter along a central axis, a cylindrical blind bore formed in the driving shaft coaxially with the center axis of the through bore the blind bore having a diameter which is larger than the shorter side of the bases but smaller than the longer side of the bases of the severing blade, a setting screw engaging in a thread in the upper part of the blind bore above the severing blade, a helical spring arranged in the lateral opening of the severing blade and resting on the bottom of the blind bore for biasing the severing blade against the setting screw, and the power supply conduit extending opposite the through bar at such a distance from the driving shaft that in the case of overspeed the severing blade is displaced by centrifugal force in the range of the conduit and interrupts the same.

By the particular arrangement of the centrifugal severing blade, of the tensioning spring which counteracts the centrifugal force and of the setting screw, the distance of the centrifugal blade from the rotary axis of the driving shaft is changed. As a consequence, by changing the position of the setting screw in the diametrical blind bore it is adjusted not only the tensioning spring which acts opposite the centrifugal force acting on the severing blade but also the value of the effective centrifugal force itself. In changing the limit rotary speed value therefore it is only the difference between the increasing centrifugal force and the increasing tensioning spring which takes effect in the adjustment. As a result, the setting range of the adjustment is substantially increased and a more accurate adjustment is made possible. The centrifugal severing blade which has the form of a quadrangular frame is substantially more stable than the fly weight known from prior art. Even in the case when the severing blade should accidentally disintegrate during its impact against the electric conduit, the tensioning spring always remains within the protective housing and accidental electrical bridging of the severed conduit by the tensioning spring is not possible.

By adjusting the mass of the centrifugal severing blade to the characteristic helical tensioning spring, it is achieved that the frame-like severing blade promptly exits from its guiding through bore when said limit rotary speed is exceeded and interrupts a predetermined portion of the power supply conduit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
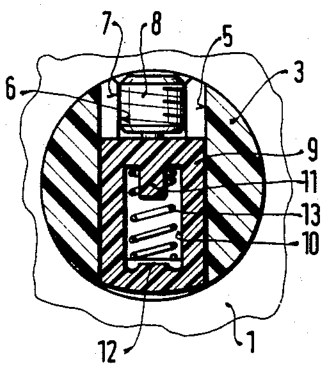
FIG. 1 is a transverse section of the overspeed protective mechanism of this invention arranged in a protective cylindrical housing coaxially attached to the driving shaft of an electric power machine.
Figure 2:
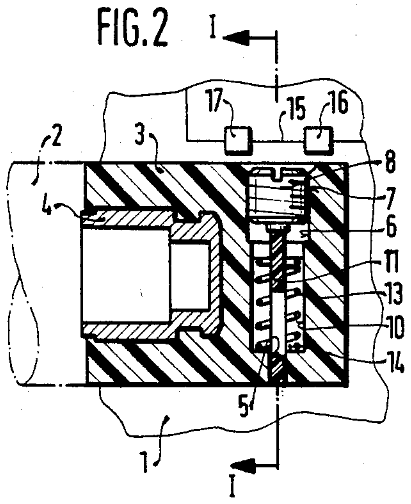
FIG. 2 is a sectional side view of the overspeed mechanism of FIG. 1 taken along the line I—I.
Figure 3:
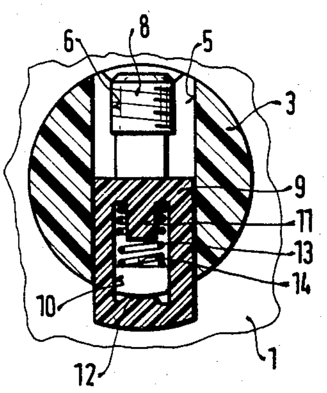
FIG. 3 is a view similar to FIG. 1 showing the centrifugal severing blade in its severing position.
Figure 4:
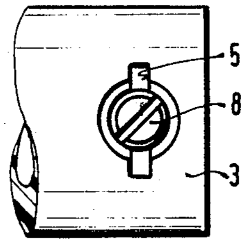
FIG. 4 is a top view on the protective device of this invention.

In the Figures, reference numeral 1 denotes a part of a housing of an electric machine which encloses a driving shaft 2 of a non-illustrated electric motor. The overspeed protection device of this invention includes a cylindrical housing 3 which is secured to the end face of the driving shaft 2. The cylindrical housing 3 of the satefy device is made preferably of a plastic material in which coaxial mounting socket 4 is embedded which is screwed on a central projection on the end face of the driving shaft 2. The free end of the cylindrical housing 3 is formed with a diametric through bore 5 of a flat rectangular cross-section whose center axis intersects at right angles the axis of rotation of the driving shaft 2. In addition, a blind bore 6 is formed in the housing 3 coaxially with the center axis of the rectangular through bore 5. The diameter of the cylindrical blind bore 6 is larger than the shorter side of the base of the rectangular through bore 5 but smaller than the longer side of this base. The upper part of the inner wall of the blind bore 6 is provided with an inner thread 7 which engages further thread of a setting screw 8. The flat quadrangular through bore 5 slidably guides in the direction of its center axis a centrifugal severing blade 9 which has the form of a quadrangular frame matching the clearance of the opening 5 and having a central recess into which an upper centering pin 11 and a lower centering pin 12 project from the opposite sides of the quadrangular frame 9. The opposite centering pins 11 and 12 serve for centering a tensioning helical spring 13 which is inserted into the central opening 10 and pressed on bottom 14 of the blind bore 6. The opposite end of the helical spring 13 surrounds the centering pin 11 and urges the frame-like severing blades against the bottom of the setting screw 8. The bottom 14 of the blind bore is partially cut through by a rectangular through bore 5 and the helical spring rests on the remaining bottom portions. Immediately above the free end of the cylindrical safety housing 3 there are provided two supports 16 and 17 (FIG. 2) located parallel to the axis of rotation of the driving shaft 2 and two opposite sides of the rectangular through bore 5. A portion 15 of a power supply conductor for the driving motor is secured between the supports 16 and 17 at such a distance from the outer surface of the housing 3 that when the severing blade 9 is displaced by centrifugal force outwards to the position illustrated in FIG. 3, the conduit 15 is in the path of movement of the extended centrifugal blade and is severed by the latter, thus interrupting the power supply circuit for the driving motor of the machine.

During the rotation of the driving shaft 2 and of the cylindrical housing 3, the centrifugal severing blade 9 is subject both to a centrifugal force depending on the mass of the blade 9, on the distance of the blade from the axis of rotation of the shaft and on the rotary speed and at the same time to the oppositely directed biasing force of tensioning spring 13. The force and the characteristic of the helical spring 13 as well as the mass of the centrifugal blade 9 are mutually adjusted in such a manner that the centrifugal force constant is greater than the spring constant. This means that during displacement of the centrifugal blade in radial direction outward the increase of the centrifugal force is always greater than the increase of the counteracting biasing force of the spring whereby at normal rotary speeds of the machine the biasing force of the helical spring 13 is greater than the centrifugal force. Only by increasing the rotary speed, the centrifugal force starts increasing while the biasing force of spring 13 remains the same inasmuch as the movement of the centrifugal blade 9 has not yet initiated. When the rotary speed further increases, the centrifugal force becomes at one point equal to the biasing force of the helical spring 13. At this balance of counteracting forces the centrifugal blade 9 still remains in its starting position. However, when the rotary speed even slightly exceeds this equilibrium point which corresponds to the set limit speed, the increased centrifugal force causes the blade 9 to move opposite the force of the spring 13. Due to the growing distance of the point of gravity of the centrifugal blade 9 from the rotary axis of the cylindrical housing 3, the centrifugal force is still increased and so on. As a result the severing blade 9 promptly exits outward from the guiding through bore 5 in the position illustrated in FIG. 3 in which the compressed windings of the spiral spring 13 serve as a buffer for the displaced centrifugal blade 9. The outward accelerated blade 9 severes the conduit 15 and interrupts the power supply for the driving motor of the machine.

For adjusting the desired speed limit value at which the overspeed protection according to this invention becomes activated, the setting screw 8 is screwed either out of the cylindrical housing 3 when the desired speed limit is intended to be increased. In this case the point of gravity of the centrifugal blade 9 is shifted by the spring closer to the rotary axis of the shaft 2. Accordingly, a higher rotary speed is necessary to produce a centrifugal force which prevails against the biasing force of the helical spring 13. For example, if the axis of rotation of the driving shaft passes through the centrifugal blade 9 the above-described effect is still increased by the fact that the ratio of the mass of the blade at one side of the rotary axis directed toward the exit opening for the blade, to the mass at the other side of the rotary axis facing the setting screw 8, is changed. The closer the center of gravity of the centrifugal blade 9 is shifted to the rotary axis the greater becomes the centrifugal force of the part of the mass of the blade taking place between the rotary axis and the setting screw 8 and this counteracting centrifugal force component must be deducted from the centrifugal force component of the mass at the other side of the blade in order to obtain the resulting centrifugal force acting against the spring force.

It will be understood that each of the elements described above, or two or more together, may also find a useful application in other types of constructions differing from the types described above.

While the invention has been illustrated and described as embodied in a specific example of the overspeed protection device for use with an electric power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electric power machine having a housing enclosing the shaft of a driving electric motor, a power supply conduit for the motor and a centrifugal mechanism for protecting the machine against excessive rotary speed by severing the power supply conduit, the protecting mechanism comprising a centrifugal severing blade in the form of a frame having two opposite bases defining a longer side and s shorter side, and a central opening between the bases;

a diametrical through bore in the driving shaft for slidably guiding the severing blade along a central axis;

a cylindrical blind bore formed in the driving shaft coaxially with the center axis of the through bore, the blind bore having a diameter which is larger than the shorter side but smaller than the longer side of the base of the severing blade;

a setting screw engaging an upper part of the blind bore above the severing blade;

a helical spring arranged in the center opening of the severing blade and resting on the bottom of the blind bore for biasing the severing blade against the setting screw; and a power supply conduit extending along the driving shaft opposite the through bore at such a distance that in the case of overspeed the severing blade is displaced by centrifugal force in the range of the conduit to interrupt the same.

2. An electric power machine as defined in claim 1, wherein the mass of the centrifugal severing blade and the characteristic of the helical spring are mutually adjusted such that the centrifugal force constant is greater than the helical spring constant and at normal operational speed of the machine the tensioning spring of the helical spring is larger than the centrifugal force acting on the severing blade.

3. An electric power machine as defined in claim 1, wherein the protecting mechanism is arranged in a cylindrical housing which is coaxially attached to the driving shaft.

4. An electric power machine as defined in claim 3, wherein the centrifugal severing blade is provided with at least one centering pin projecting into the central opening for centering the helical spring.

* * * * *